United States Patent
Tournier

[11] 4,318,205
[45] Mar. 9, 1982

[54] PROCESS FOR PEELING OFF INNER PROTECTIVE TISSUE OF ANIMAL OESOPHAGUS

[76] Inventor: Claude Tournier, Laloubiere, Lioujas, 12000 Rodez, France

[21] Appl. No.: 125,271

[22] Filed: Feb. 27, 1980

[30] Foreign Application Priority Data

Mar. 28, 1979 [FR] France ................................ 79 08279

[51] Int. Cl.$^3$ .............................................. A22C 17/00
[52] U.S. Cl. ........................................ 17/45; 17/1 R; 17/43; 426/480; 426/483
[58] Field of Search .................... 17/1 R, 43, 21, 45; 426/480, 483, 524

[56] References Cited

U.S. PATENT DOCUMENTS

| | | | |
|---|---|---|---|
| 2,231,954 | 2/1941 | Scherubel | 17/45 |
| 2,560,603 | 7/1951 | Selby | 17/43 |
| 2,595,638 | 5/1952 | Castelow | 17/43 |
| 3,149,923 | 9/1964 | Hughes | 17/1 R |

*Primary Examiner*—Willie G. Abercrombie

[57] ABSTRACT

The present invention relates to a process for peeling off the protective tissue of musculomembranous organs.

This process successively consists in:
  making the said organs to change into a solid state by freezing:
  and abrading the protective tissue of those frozen organs.

The process of the invention is especially applied to peel off the inner membrane of the oesophagus of slaughterhouse animals.

4 Claims, 1 Drawing Figure

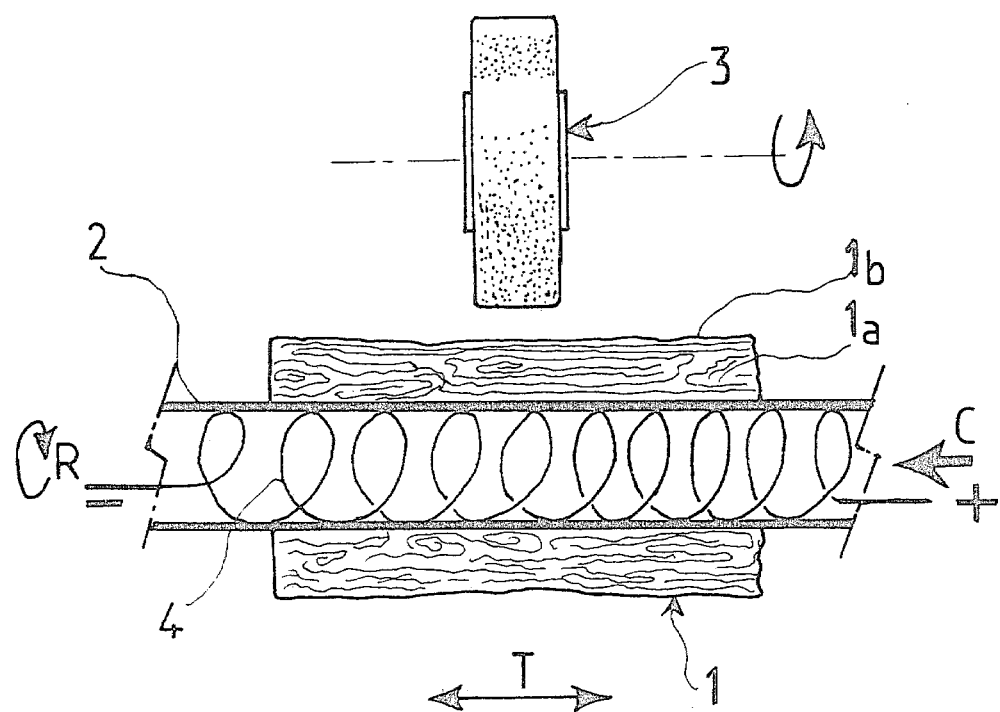

PROCESS FOR PEELING OFF INNER PROTECTIVE TISSUE OF ANIMAL OESOPHAGUS

The present invention relates to the meat-processing industry and, especially, to a process for peeling off the protective tissue of the musculomembranous organs of animals such as beef, calves, sheep, etc. . . .

The muscular tissue of those organs and especially that of the hollowed musculomembranous organs such as the duct going from the pharynx to the stomach cardia, usually called oesophagus, is a substance in great demand for nutritive preparation. So, to extract the muscular tissue of those organs, it is necessary to peel off the protective tissue or mucosa that generally appears as a very thin membrane.

The usual system for peeling off this membrane called "mucous membrane" is still manually operated by scraping off with a scraping tool such as a knife. Such a method is long and considered drudgery, which obviously reduces the rate of profitability of such an operation of recovering said organs and, especially, oesophagus.

It is an object of the present invention to provide a process to work those animal musculomembranous organs, allowing quick peeling off of the mucous membrane covering the muscular tissue of the said organs. Owing to this process, it will not only be possible to profit considerably by the utilization of those organs but also to improve the quality of muscular tissue obtained.

According to the present invention, this process successively consists in:

solidifying the organs to be work;

and, abrading the mucous membrane of the organs thus processed, by means of an abrasive tool, preferably rotative.

It is then clearly understood that the solidification of those organs presents the great advantage of a surface working, as if it were a mechanical unit and thus permits the utilization of usual tool machining, e.g. in the present case, of an abrasive rotative tool. Such a tool also permits modulation of the abrasion of the mucous membrane with respect to its thickness in order to obtain a homogeneous muscular tissue, i.e. free from mucous tissue wastes.

According to an advantageous characteristic of the invention, the process consists in making the musculomembranous organs to change into solid state by freezing, a frequently used technique in the meat-processing industry because deep-freezing resolves storage, packaging, and cutting up problems of meat-processing.

The present invention will be better understood and more characteristics will be most readily comprehended, through reference to the following description, giving, as a non limitative example, an application of the process of the invention for peeling off the inner mucous membrane of the oesophagus of slaughter-house animals.

This description is taken in connection with the accompanying sectional drawing FIGURE that illustrates the elements permitting to work the said oesophagus.

The recovery of the muscular tissue $1a$ of an oesophagus 1 is effected according to the following steps:

First, after being pulled out from the digestive system of the animal body, the oesophagus 1 is turned inside out so that the inner mucous membrane $1b$ appears on the exterior of the said oesophagus.

As a second step, a rigid support-tube 2 is introduced inside the oesophagus. This tube provides uniformity of the tubular form of the oesophagus 1 and, especially of the membrane $1b$; it may also be used as a support for the oesophagus which is filled end to end.

As a third step, the whole tube-oesophagus is put under a freezing cycle allowing, (i) hardening of the oesophagus 1 and, (ii) its storage for subsequent utilization. For the purpose, the optimal temperature of freezing will be $-30°$ C.

As a fourth step, the oesophagus is put under the action of an abrasive-wheel 3 whose abrasive grains attack the mucous membrane $1b$ until it disappears. Of course, the whole tube-oesophagus will be moved by a rotative movement together with a translation movement (arrows R and T respectively) in order to use up the entire surface of membrane $1b$; those movements R and T can be manually or mechanically operated.

As a fifth and last step, the external surface of tube 2 in close contact with the oesophagus 1 is heated in order to detach the oesophagus easily from the said tube frozen for its storage. The heating of the tube 2 can be achieved for example by a heating resistor 4 fitted inside the said tube or by hot air circulation (arrow C).

Having now described the invention and its interest illustrated by a detailed example, the applicant claims the exclusive invention, limited to the precise elements shown in so far as such limitations are defined by the appended claims.

What I claim is:

1. A process for peeling off the protective tissue of the inner coats of hollowed musculomembranous organs of animals, such as the oesophagus, consisting successively in:

turning inside out the said oesophagus to expose the inner protective tissue, making uniform the tubular form of the oesophagus, solidifying the oesophagus by means of a freezing operation, and then abrading the oesophagus by means of a rotative abrasive tool in order to wear down the thickness of the outer layer constituting the said protective tissue.

2. A process according to claim 1, wherein the tubular form of the oesophagus is made uniform by means of the introduction therethrough of a rigid tube.

3. A process according to claim 2, wherein the external surface of said tube is heated by means of circulating hot air through said tube to separate it from the oesophagus.

4. A process according to claim 2, wherein the external surface of said tube is heated by means of a heating resistor fitted inside the tube to separate it from the oesophagus.

* * * * *